United States Patent
Leslie et al.

(12) 
(10) Patent No.: US 6,559,921 B1
(45) Date of Patent: May 6, 2003

(54) LIQUID CRYSTAL PLANAR NON-BLOCKING NXN CROSS-CONNECT

(75) Inventors: Thomas M Leslie, Horseheads, NY (US); Robert G Lindquist, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/431,430

(22) Filed: Nov. 1, 1999

(51) Int. Cl.[7] .............................................. G02F 1/133
(52) U.S. Cl. ........................................................ 349/196
(58) Field of Search .............................. 349/196; 385/2, 385/8

(56) References Cited

U.S. PATENT DOCUMENTS

| | | | |
|---|---|---|---|
| 4,201,442 A | * 5/1980 | McMahon et al. | ........... 349/196 |
| 5,133,037 A | * 7/1992 | Yoon et al. | .................. 359/332 |
| 5,825,524 A | * 10/1998 | Faderl et al. | ................ 359/245 |
| 6,208,774 B1 | 3/2001 | Sorin et al. | |
| 6,424,755 B1 | * 7/2002 | Clapp | ........................ 385/129 |

FOREIGN PATENT DOCUMENTS

| | | |
|---|---|---|
| DE | 19514782 A1 | 4/1994 |
| EP | 0029737 | 11/1979 |
| JP | 62127829 | 6/1987 |
| JP | 402144513 A | * 6/1990 ................. 349/196 |

OTHER PUBLICATIONS

Kobayashi, M. et al. "2×2 Optical Waveguide Matrix Switch Using Nematic Liquid Crystal", IEEE Transaction on Microwave Theory and Techniques vol. MTT–30 (1982) No. 10, Oct. 1982.

Sheridan, JP et al. "Electro–optically induced deflection in liquid–crystal waveguides", Journal of Applied Physics, vol. 45, No. 12, Dec. 1974.

* cited by examiner

*Primary Examiner*—James Dudek
(74) *Attorney, Agent, or Firm*—Daniel P. Malley; Gregory V. Bean

(57) ABSTRACT

A non-blocking N×N cross-connect is provided that has an array of liquid crystal (LC) switches in a grid of planar optical waveguides within a light optical circuit (LOC). LC filled trenches are used in a planar optical waveguide and each trench provides the functionality of a waveguide polarization splitter, a transverse electric (TE) switch cross point, a transverse magnetic (TM) switch cross point, or a waveguide polarization combiner. By combining these elements, a cross-connect system is fabricated.

37 Claims, 5 Drawing Sheets

LIQUID CRYSTAL PLANAR NON-BLOCKING NXN CROSS-CONNECT

FIELD OF THE INVENTION

The present invention relates in general to optical switching devices. More particularly, the present invention relates to a liquid crystal cross-connect for an optical waveguide.

BACKGROUND OF THE INVENTION

One of the current trends in telecommunications is the use of optical fibers in place of the more conventional transmission media. One advantage of optical fibers is their larger available bandwidth handling ability that provides the capability to convey larger quantities of information for a substantial number of subscribers via a media of considerably smaller size. Further, because lightwaves are shorter than microwaves, for example, a considerable reduction in component size is possible. As a result, a reduction in material, manufacturing, and packaging costs is achieved. Moreover, optical fibers do not emit any electromagnetic or radio frequency radiation of consequence and, hence, have negligible impact on the surrounding environment. As an additional advantage, optical fibers are much less sensitive to extraneous radio frequency emissions from surrounding devices and systems. With the advent of optical fiber networks, flexible switching devices are needed to direct light signals between fibers to all-optical domain fiber networks.

SUMMARY OF THE INVENTION

One aspect of the invention is an optical device for directing a light signal, including an optical path for propagating the light signal. A trench is formed in the optical path, the trench including a surface region. An alignment layer is disposed on the surface region, and a liquid crystal material is disposed in the trench, the liquid crystal material having a plurality of molecules that are aligned in a first direction by the alignment layer.

Another aspect of the invention is a method of directing a light signal in an optical device, the optical device having a first optical path and a second optical path, the method including forming a trench in a cross-point, wherein the cross-point is a location where the first optical path intersects the second optical path. The method includes forming an alignment layer on a surface region of the trench. The method also includes disposing a liquid crystal material having a plurality of molecules in the trench, wherein the alignment layer causes the plurality of molecules to align in a first direction, and applying a voltage to the liquid crystal material to thereby change an alignment of the plurality of molecules from the first direction to a second direction to cause a portion of the light signal to be directed from the first optical path into the second optical path.

Another aspect of the invention is a method of directing a light signal in an optical device, the optical device including an optical path, a trench formed in the optical path, and an alignment layer disposed on a surface of the trench, the method including disposing a switch element in the trench, the switch element including a plurality of liquid crystal molecules that are aligned in a first direction by the alignment layer when no electrical energy is applied to the switch element, and applying electrical energy to the switch element to thereby cause the plurality of molecules to align in a second direction.

Another aspect of the invention is an optical device for directing a light signal, the optical device including a substrate having an optical waveguide layer disposed thereon. The optical device also includes at least one first electrode disposed between the substrate and the optical waveguide, a trench formed in the optical waveguide, the trench having a surface area. A first alignment layer is disposed on the surface area of the trench. A liquid crystal material is disposed in the trench covering the first alignment layer. A top plate is connected to the substrate, and a second alignment layer is disposed on the top plate and adjacent to the liquid crystal material.

Another aspect of the invention is a liquid crystal cross-connect device,. including an input port for receiving light, a polarization splitter to split the received light into transverse magnetic (TM) and transverse electric (TE) components, a TM switch array connected to receive the TM components from the polarization splitter, a TE switch array connected to receive the TE components from the polarization splitter, a polarization combiner coupled to the TM switch array and the TE switch array to combine the outputs of the TM switch array and the TE switch array; and an output port coupled to the polarization combiner.

The foregoing and other aspects of the present invention will become apparent from the following detailed description of the invention when considered in conjunction with the accompanying drawings.

DETAILED DESCRIPTION OF THE INVENTION

The present invention is directed to a non-blocking N×N cross-connect having an array of liquid crystal (LC) switches in a grid of planar optical waveguides within a light optical circuit (LOC). LC filled trenches or canals are used in a planar optical waveguide and each trench or canal can provide the functionality of a waveguide polarization splitter, a transverse electric (TE) switch cross point, a transverse magnetic (TM) switch cross point, a waveguide polarization combiner, a filter, variable optical attenuator, or a signal splitter. By combining these elements, a cross-connect system can be fabricated. The LC material in the trench or canal can be electrically addressed to create an index change that can either match the waveguide conditions or create a total internal reflection condition.

Figure 1A:
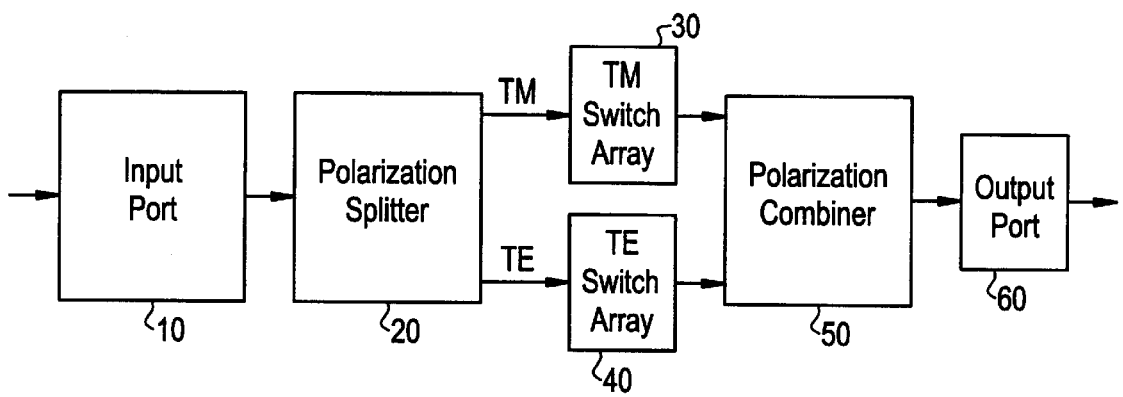
FIG. 1A shows an exemplary cross-connect system in accordance with the present invention.

FIG. 1A shows an exemplary cross-connect system in accordance with the present invention. The exemplary system comprises an input port 10, a polarization splitting segment 20, a TM switch array 30, a TE switch array 40, a polarization combining segment 50, and an output port 60. The input port 10 is a linear array of planar waveguides to which an array of fibers can be pigtailed. The spacing between waveguides is determined by pigtailing capabilities. Light from the fibers enters the input port 10 and is passed to the polarization splitter 20. The polarization splitter separates light into its TM and TE components. The TM components are then passed to the TM switch array 30, and the TE components are passed to the TE switch array 40. As described in further detail below, the outputs of the switch arrays 30 and 40 are combined by the polarization combiner 50 and passed to the output port 60. Similar to the input port 10, the output port 60 is a linear array of planar waveguides to which an array of fibers can be pigtailed.

It should be noted that TM and TE are defined herein by convention at the LC trench or canal interfaces, and not by waveguide convention.

Figure 1B:
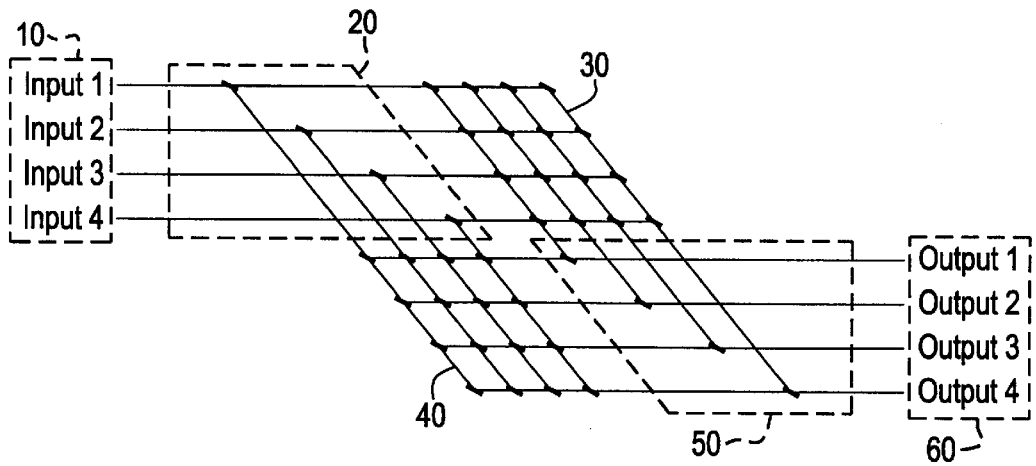
FIG. 1B shows a more detailed cross-connect system of FIG. 1A with the exemplary cross-connect being a 4×4 cross-connect.
Figure 1C:
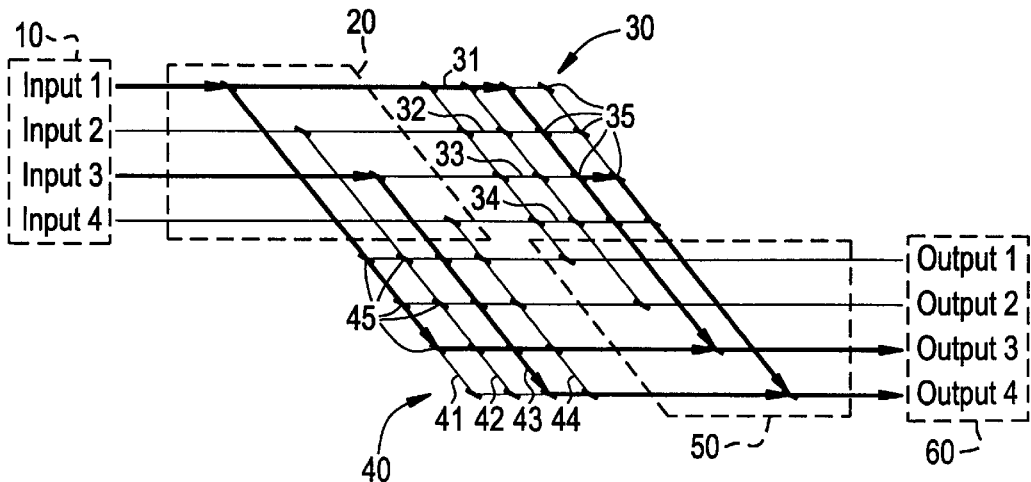
FIG. 1C shows an exemplary switch path for two input fibers of FIG. 1B.

FIG. 1B shows a more detailed cross-connect system of FIG. 1A with the exemplary cross-connect being a 4×4 cross-connect, and FIG. 1C shows an exemplary switch path for input fibers 1 and 3 of FIG. 1B. Light from the input port 10 enters the polarization splitter 20 that reflects the TE waves to the TE switch array 40 while passing the TM waves to the TM switch array 30. The switching arrays 30, 40 are preferably between about 50 and 500 μm center to center, and more preferably about 250 μm center to center. Each switch array 30, 40 has a plurality of switching elements 15 35, 45 in each path 31-34 and 41-44, respectively. A single switching element in each path is set to a reflecting state to pass the light onto the polarization combiner 50. It should be noted that the path difference for the TE and TM waves are substantially identical. The polarization combiner 50 allows the TE wave to pass while reflecting the TM wave to recombine, as shown, for example, in FIG. 8, described below. Thus, the beams are recombined and passed to the appropriate path in the output port 60.

Figure 2:
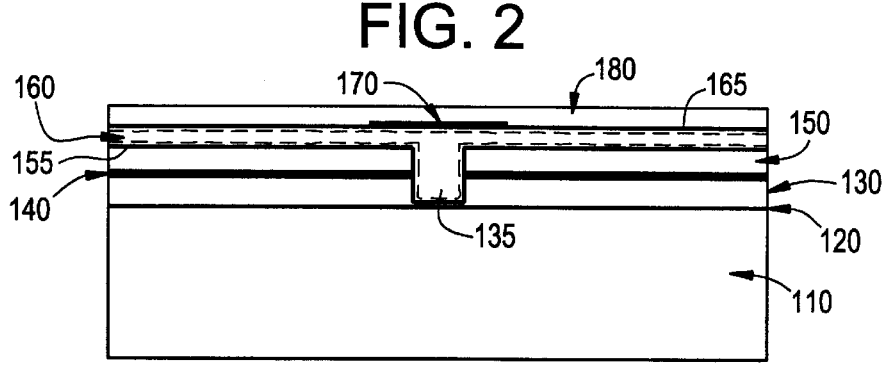
FIG. 2 shows a cross-sectional side view of an exemplary liquid crystal (LC) filled trench or canal in a planar waveguide in accordance with the present invention.

The polarization splitter 20, the switching arrays 30, 40, and polarization combiner 50 are preferably formed within the same fundamental element, which is preferably a liquid crystal (LC) filled trench or canal in a planar waveguide, as shown in FIG. 2. An LC film 160 is sandwiched between two plates or substrates having patterned deposited thin films thereon. The structure functions as the desired element depending on an applied voltage, as described below.

The bottom plate or substrate 110 on which the waveguide is patterned preferably has five deposited layers thereon. The first layer is a first electrode 120, such as a grounding electrode that comprises an unpatterned conductive coating such as gold, aluminum, or indium tin oxide. The grounding electrode can be either a single electrode or a segmented electrode. A cladding layer 130 is deposited on the first electrode 120, and comprises a cladding layer having a thickness between about 12 and 50 μm thick for the planar waveguide. A core layer 140 is deposited on the cladding layer to a thickness between about 4 and 10 μm. The layers 130 and 140 are etched or otherwise patterned to form trenches or canals 135 that provide the grid structure of FIG. 1B. A cladding layer 150, similar to the cladding layer 130, is formed above the patterned core layer 140 to a thickness between about 12 and 50 μm. The trench can either be a slot in the optical path, or a canal that runs the length of the device.

A first alignment layer 155 is disposed above the cladding layer 150 and in the trench or canal 135 directly over the portion of the first electrode 120 that is exposed by the etching or patterning of layers 130 and 140. The alignment layer 155 comprises a thin copolymer layer or other material, such as an obliquely evaporated SiO, silane coupling agents, or a polymer, to assist in homeotropic alignment of LC material in the liquid crystal layer 160. The alignment layer 155 is preferably deposited to a thickness of between one monolayer and about 100?. The alignment layer 155 should be thin enough to avoid creating an optical effect due to its refractive index.

The liquid crystal layer 160 is then deposited over the first alignment layer 155 both in the trench or canal 135 and over the cladding layer 150. The thickness of the liquid crystal material above the first alignment layer 155 is preferably less than about 25 μm. Any liquid crystal material can be used, including those from the nematic class (preferred) and the ferroelectric class. One liquid crystal material that can be used is EM Chemicals BL009, having a Δn of about 0.28. It should be noted that the larger the Δn for the LC material, the more preferable the material is for use with the system of the present invention. The index matching and the angles of the LC crystals are responsive to the Δn.

A second alignment layer 165 is disposed on the liquid crystal layer 160. The second alignment layer 165 is preferably substantially similar in composition and thickness to the alignment layer 155, although this does not have to be the case. For instance, the second alignment layer 165 may be disposed such that a homogeneous or parallel alignment of the LC molecules occurs. The second alignment layer 165 can be either homeotropic (perpendicular) or homogeneous (parallel) and still provide the desired alignment in the trench or canal.

A top plate preferably has two deposited layers. A first plate layer is a second electrode, such as an address electrode layer 170 that comprises a patterned conductive coating such as gold, aluminum, or indium tin oxide. A second plate layer is a cover glass 180. The thickness of the layers 170 and 180 is not critical, as would be known by those skilled in the art, and each can have a thickness between about 0.3 and 300 μm or even greater. It should be noted that the first and second electrodes can act as the grounding and address electrodes, respectively, or the first and second electrodes can act as the address and grounding electrodes, respectively.

Figure 3A:
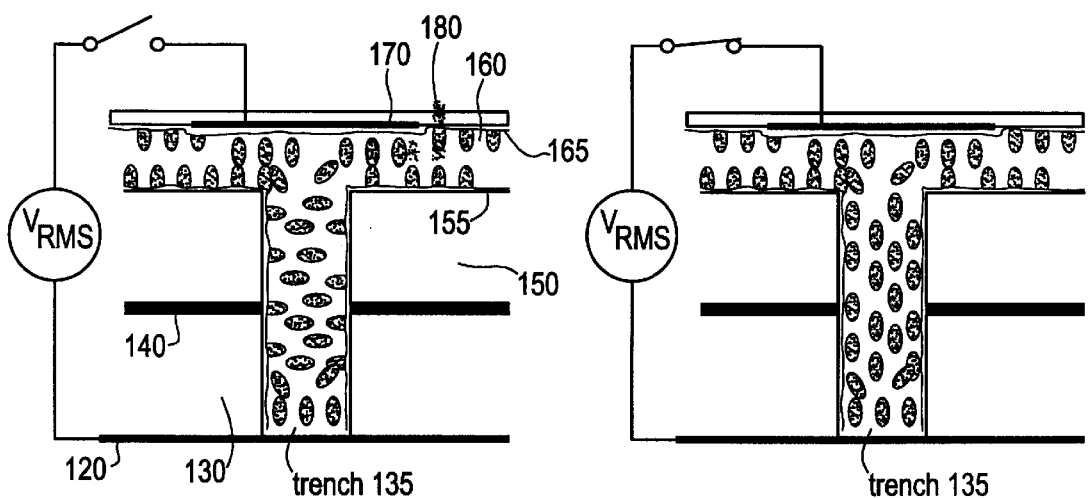
FIGS. 3A and 3B illustrate the orientation of the LC molecules in an exemplary trench or canal without and with a voltage applied to an address electrode, respectively.
Figure 3B:
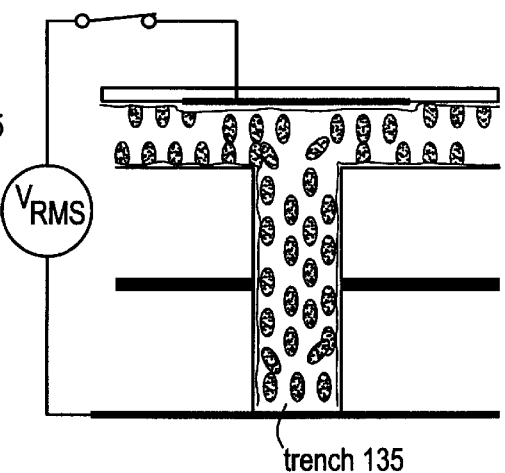

FIGS. 3A and 3B illustrate the orientation of the LC molecules of the LC layer 160 in the trench or canal 135 without and with a voltage applied to the second electrode 170, respectively. With substantially no voltage applied, as shown in FIG. 3A, the LC molecules tend to align substantially perpendicular to any interface coated with a properly chosen first alignment layer. The LC will align parallel or perpendicular to the surface treated with the second alignment layer depending on what type has been chosen. Therefore, the director axis inside the trench or canal 135 lies in the plane of the waveguide fabric and perpendicular to the trench interface or canal interface. When a sufficient voltage is applied to the address electrode, as shown in FIG. 3B, the LC molecules rotate to align with the electric field. In this case, the director axis lies substantially perpendicular to the substrate. A typical voltage that is sufficient to turn on the address electrode is between about 3 and 5 volts. The threshold voltage depends on the liquid crystal material being used and the distance between the electrodes. It should be noted that the higher the applied voltage above the threshold voltage, the faster the switch.

Because the birefringence of an LC material is typically on the order of about 0.1 to 0.3, the optical properties for the TE and TM guided modes are substantially different and can be significantly changed with an applied field. As described below, the trenches or canals can be used for polarization splitting, TE and TM switching, polarization combining, signal splitting, and variable optical attenuating.

Figure 4:
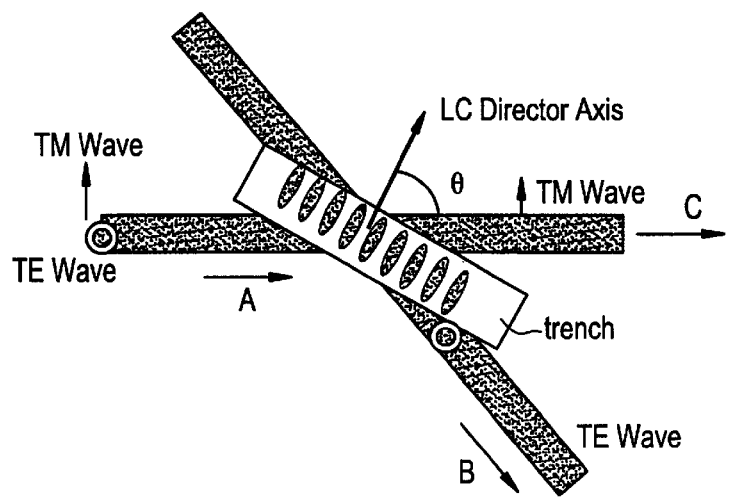
FIG. 4 shows a top view of an exemplary trench or canal in a polarization splitter in accordance with the present invention.

LC switches are polarization dependent and thus, the TE and TM waves are handled separately. The polarization splitting element 20 splits the TM and TE guided waves into independent paths. To accomplish this, each guide from the input port 10 passes through a polarization splitting element 20 that is an LC filled trench or canal. A top view of an exemplary trench or canal used in a polarization splitting element is shown in FIG. 4. As shown in FIG. 4, a trench or canal intersects the waveguide at an angle θ that is typically about 60 to 70 degrees depending on the characteristics of both the waveguide and the LC. With no voltage applied across the trench or canal, the director axis of the liquid crystalline material lies substantially perpendicular to the trench wall or canal wall. The TM wave at the interface will couple directly into the extraordinary wave inside the LC layer. The effective refractive index will have a value determined by $$n_{\it eff}(\Phi) = \left[\frac{n_o^2 n_e^2}{n_e^2\cos^2(\Phi) + n_o^2\sin^2(\Phi)}\right]^{1/2}$$

in which $n_o$ (~1.5) is the ordinary refractive index of the LC, $n_e$ (~1.6 to 1.8) is the extraordinary refractive index, and $\Phi$ is the angle between the wave propagation vector and the LC director axis. If the guide index (~1.7) and LC materials are properly matched via the Fresnel coefficients for an anisotropic interface, the TM wave passes through the trench or canal with little or no reflection. The TE wave, however, does not. The TE wave couples directly into the ordinary ray in the LC layer which has an index of $n_o$ (~1.5). This index is considerably lower than the effective guide index, thus resulting in total internal reflection (TIR) at the interface. Thus, the TM wave passes through the trench or canal and the TE wave is totally internally reflected at the interface into a separate guide. In other words, both the TE and TM waves move in the direction of arrow A in FIG. 4, the TE wave is reflected at the interface and travels in the direction of arrow B due to index mismatching, and the TM wave passes through in the direction of arrow C due to index matching. The guide is desirably offset from the interface to account for the Goos Hanschen effect. It should be noted that the index values used herein are based on commercially available material.

Figure 5:
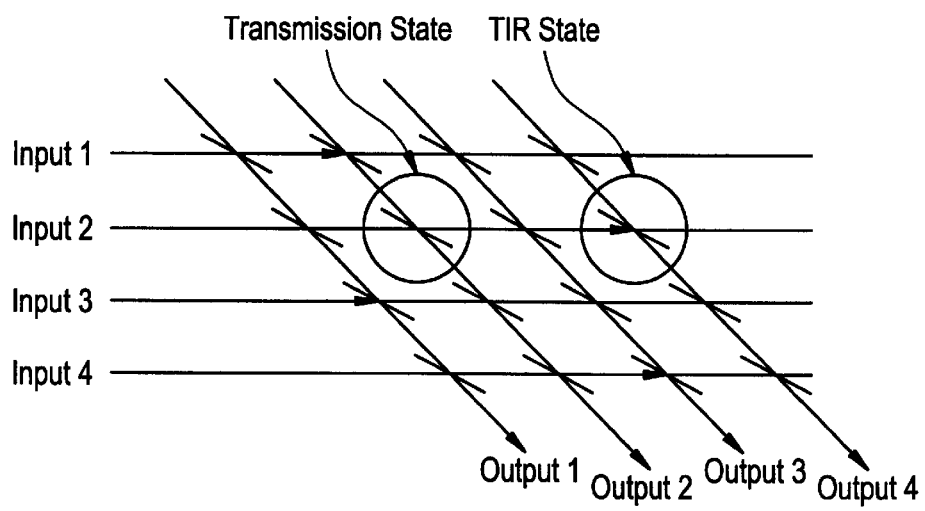
FIG. 5 shows an exemplary switch matrix in accordance with the present invention.

The TM switch array is an N×N waveguide with $N^2$ trenches or canals at the intersections. FIG. 5 shows an exemplary switch matrix. All but one of the trenches or canals are set in the transmission state using index matching, and one intersection in each row is set to a TIR state using index mismatching. To insure that one input fiber is exclusively assigned to one output fiber, preferably only one trench or canal in any column is set to the TIR state. By controlling which trenches or canals are set in the TIR state, a non-blocking N×N switch matrix is achieved for a set of input TM waves.

Figure 6A:
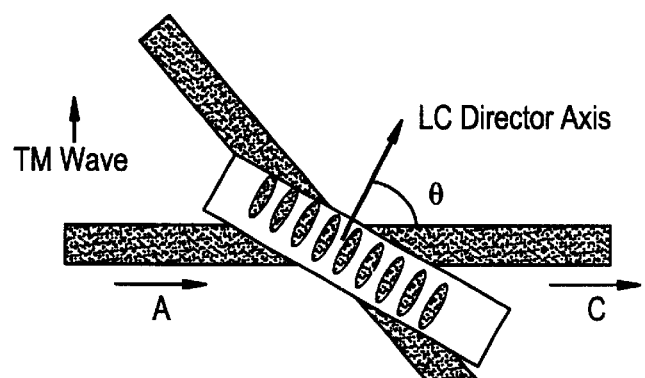
FIGS. 6A and 6B show a top view of an exemplary LC trench or canal in the transmission and TIR states, respectively, for a TM wave in an exemplary TM switch ay in accordance with the present invention.
Figure 6B:
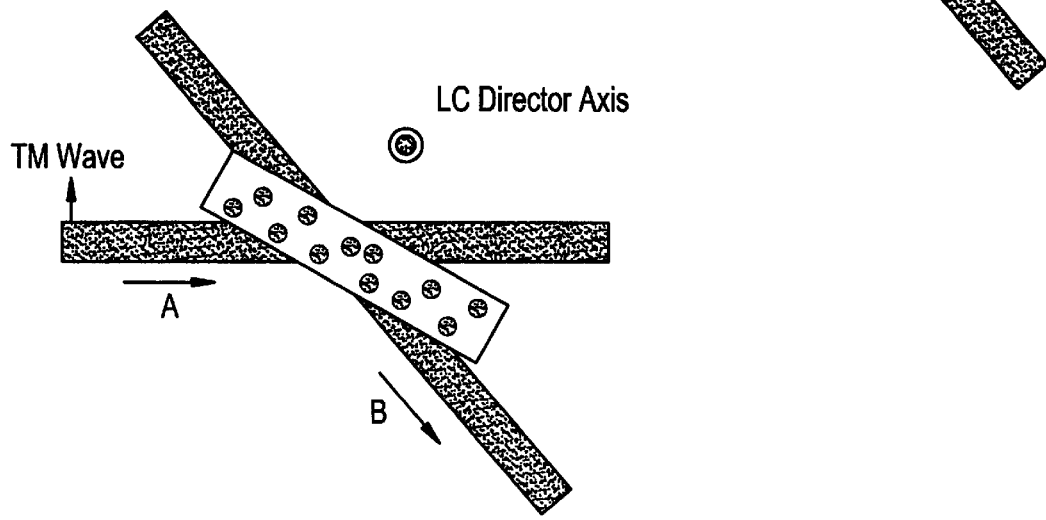

A top view of exemplary LC trenches or canals in both the transmission and TIR states are given in FIGS. 6A and 6B, respectively, for a TM switch array. FIG. 6A is substantially identical to FIG. 4 and thus it is expected that the TM wave, moving in the direction of arrow A, passes through the trench or canal with minimal reflections, to travel in the direction of arrow C. When an electric field above a predetermined threshold voltage characteristic (typically about 3 to 5 volts) of the LC material is applied from top to bottom through the trench or canal, the LC director axis rotates to align with the field lines giving an orientation as shown in FIG. 6B. In this state, the TM wave no longer couples to the extraordinary wave, but rather to the ordinary ray. Because the ordinary ray has an index of $n_o$ (~1.5), the TM wave travelling in the direction of arrow A will totally internally reflect to travel in another waveguide in the direction of arrow B. Thus, a Avoltage-off@ state across the LC trench or canal is a transmission state and a Avoltage-on@ state across the LC trench or canal is a TIR state.

Figure 7A:
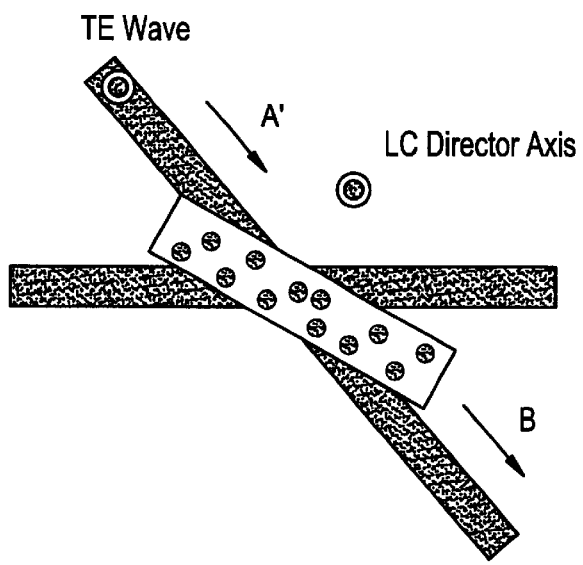
FIGS. 7A and 7B show a top view of an exemplary LC trench or canal in the transmission and TIR states, respectively, for a TE wave in an exemplary TE switch ray in accordance with the present invention.
Figure 7B:
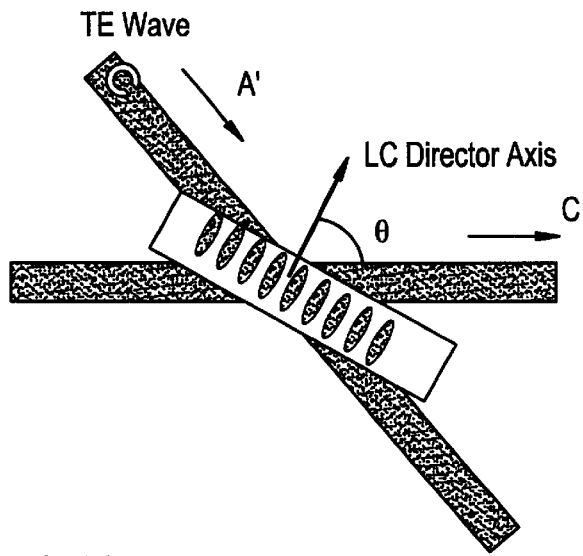

The TE switch array is the Avoltage-dual@ of the TM switch array. In other words, the TE switch array is also an N×N waveguide array with $N^2$ trenches or canals at the intersections. It has a single TIR state for input path with remaining trenches or canals in the transmission state. However, the TIR state is the Avoltage-off@ state and the transmission state is the Avoltage-on@ state. FIGS. 7A and 7B illustrate the transmission and TIR states, respectively, for the TE wave in a TE switch array. In the transmitting state, the TE wave couples into the extraordinary wave with an effective index equal to $n_e$. By matching the index with the guide, the TE wave travels in the direction of arrow A', passes through the trench or canal with little or no reflection, and thus continues to travel in the direction of arrow B. In the TIR state, the TE wave couples into the ordinary ray inside the LC material, thereby travelling in the direction of arrow C. The ordinary ray has an index of $n_o$ (~1.5) resulting in a TIR state for the TE wave.

Figure 8:
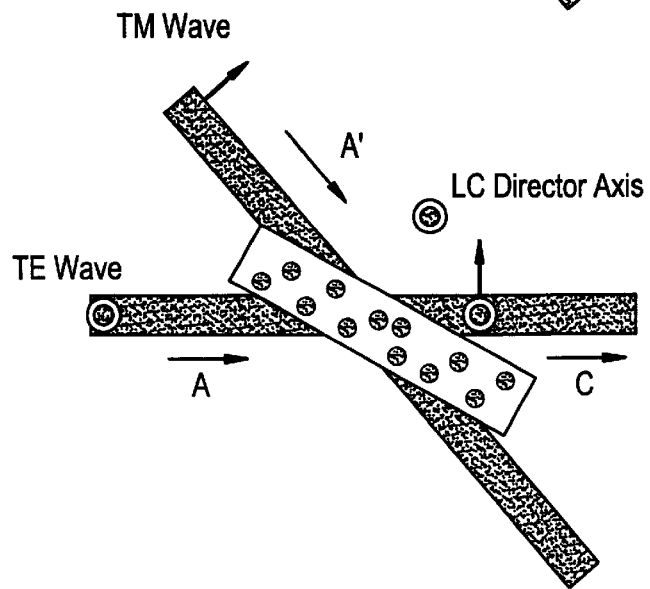
FIG. 8 shows the combined transmission state for a TE wave and the TIR state or a TM wave in accordance with the present invention.

The polarization combining element combines the TM and TE waves prior to their being sent to the output port. The polarization combining element is the Avoltage-dual@ of the polarization splitter. The trenches or canals have an RMS voltage applied to align the LC director axis perpendicular to the substrate. As described above, the Avoltage-on@ state is the transmission state for the TE and is the TIR state for the TM wave. The combined feature is illustrated in FIG. 8. The TE wave travels in the direction of arrow A, and the TM wave travels in the direction of A'. At the trench or canal, the TE wave passes through and the TM wave is totally internally reflected, resulting in both the TE and TM waves combining to travel in the direction of arrow C.

It should be noted that crosstalk depends primarily on the quality of index matching between the effective guide index and the effective index of the extraordinary wave. For the upper section of the cross-connect system, that includes the splitting and TM switching, the guide is preferably matched to a value slightly less than $n_e$. For the lower section (the dual for the upper: the combining and the TE switching), the guide index is preferably matched to $n_e$. To satisfy both conditions, several options exist: (1) electrical compensation (one can tune into the appropriate index with voltage), (2) different LC materials for the upper and lower section (requires two LC materials, but is relatively easy to manufacture), (3) differing guide index for upper and lower section (unattractive option due to complexity), or (4) a different angle of the trench or canal. Preferably, option (2) is used in which the LC layer comprises two different layers of LC material that will give improved matching.

The planar cross-connect is compact, less complex, and low cost. Moreover, the device is scaleable to large arrays. Electrical compensation and/or different LC materials can be used to improve crosstalk and compensate for thermal effects.

Thus, an N×N non-blocking cross-connect based on LC and planar waveguide technologies has been described. An N×M cross-connect system is also within the scope of the present invention. The technology is scalable, compact, and low cost. Additionally, the LC trenches or canals can be electrically compensated for thermal effects to insure low crosstalk.

Figure 9:
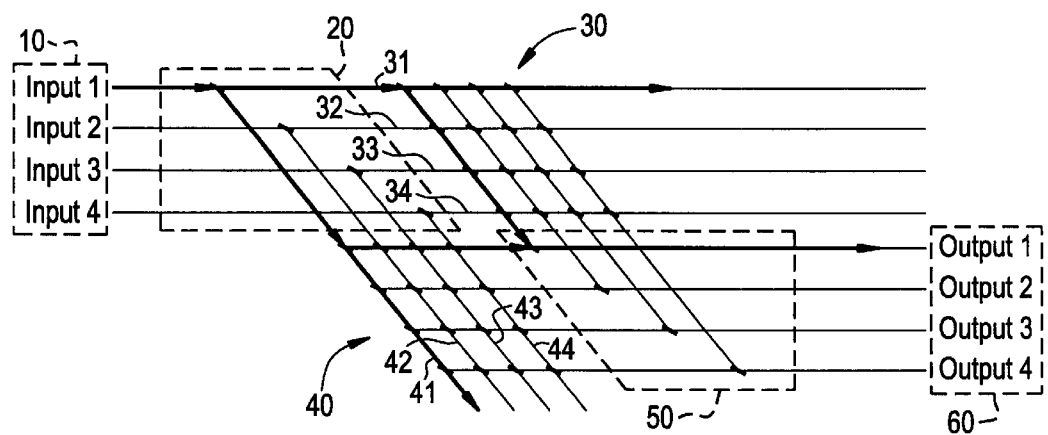
FIG. 9 shows an exemplary switch path for an exemplary variable optical attenuator in accordance with the present invention.
Figure 10:
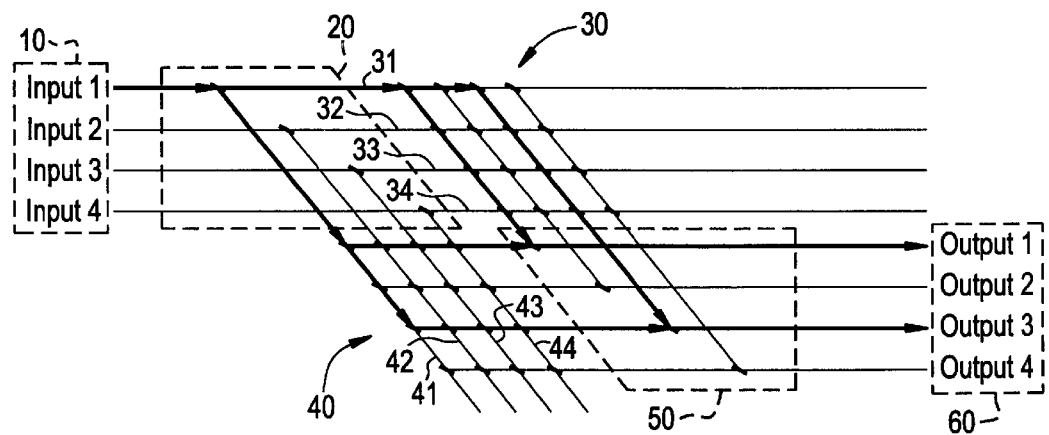
FIG. 10 shows an exemplary switch path for an exemplary power distributor/splitter in accordance with the present invention.

In addition to switching, the LC trench or canal can act as a partial reflector of the TE or TM wave in a variable optical attenuator and a variable broadcast element. A voltage range exists between the transmitting and total internal reflection states in which the LC molecules do not fully rotate to align with the electric field. In this case, the beam is partially transmitting and partially reflecting. This effect provides the additional functionality of a variable optical attenuator (VOA) and a power distribution/splitter. An exemplary variable optical attenuator operation is illustrated in FIG. 9. In both the TE and TM switch arrays 30, 40, a voltage is applied such that only a portion of light is reflected. Thus, the output beam is attenuated in a controlled manner through output port 1. In a similar manner, an exemplary power distributor/splitter is illustrated in FIG. 10 in which a beam from the input port 1 is split between the output ports 1 and 3.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. An optical device for directing a light signal, comprising:
    a first optical waveguide for propagating the light signal;
    a trench formed across the optical waveguide, said trench including an interface surface between said trench and said waveguide;
    an alignment layer disposed on said interface surface; and
    a liquid crystal material disposed in said trench, said liquid crystal material having a plurality of molecules that are aligned perpendicular to said interface surface by said alignment layer.

2. The optical device according to claim 1, further comprising
    at least one second optical waveguide intersecting said first optical waveguide at a cross-point, wherein the trench is disposed at said cross-point.

3. The optical device according to claim 2, further comprising a switching device coupled to the liquid crystal material.

4. The optical device according to claim 3, wherein the switching device is a pair of electrodes.

5. The optical device according to claim 2, wherein the alignment layer comprises at least one of a copolymer, a polymer, obliquely evaporated SiO, and silane couple agents.

6. The optical device according to claim 1, wherein the trench is a slot in the optical path.

7. The optical device according to claim 1, wherein the trench is a canal substantially extending the length of the optical device.

8. The optical device according to claim 1, wherein the optical device is disposed within one of a polarization splitter, a polarization combiner, a TM switch, a TE switch, a variable optical attenuator, a signal splitter, and an N×N TE-TM array.

9. A method of directing a light signal in an optical device, said optical device having a first optical path and a second optical path, said method comprising:
    forming a trench in a cross-point, wherein said cross-point is a location where the first optical path intersects the second optical path, said trench having an interface surface at at which said trench intersects said first and second optical paths;
    forming an alignment layer on the interface surface of the trench;
    disposing a liquid crystal material having a plurality of molecules in the trench, wherein said alignment layer causes said plurality of molecules to align in a first direction perpendicular to said interface surface; and
    applying a voltage to said liquid crystal material to thereby change an alignment of said plurality of molecules from said first direction to a second direction to cause a portion of the light signal to be directed from the first optical path into the second optical path.

10. A method of directing a light signal in an optical device, said optical device including an optical path, a trench formed in said optical path, said trench having an interface surface at at which said trench intersects said optical path and an alignment layer disposed on said interface surface of said trench, said method comprising:
    disposing a switch element in the trench, said switch element including a plurality of liquid crystal molecules that are aligned in a first direction perpendicular to said interface surface by the alignment layer when no electrical energy is applied to said switch element; and
    applying electrical energy to said switch element to thereby cause said plurality of molecules to align in a second direction.

11. The method according to claim 10, wherein the plurality of molecules comprises liquid crystal molecules.

12. An optical device for directing a light signal, said optical device including a substrate having an optical waveguide layer disposed thereon, said optical device comprising:
    at least one first electrode disposed between the substrate and the optical waveguide;
    a trench formed across the optical waveguide, said trench having an interface surface between said trench and said waveguide;
    a first alignment layer disposed on the interface surface of said trench;
    a liquid crystal material disposed in said trench and covering said first alignment layer;
    a top plate connected to the substrate; and a second alignment layer disposed on the top plate and adjacent to said liquid crystal material.

13. The device according to claim 12, wherein the top plate comprises:

a cover glass connected to the substrate; and a second electrode disposed between said cover glass and the second alignment layer.

14. The device according to claim 13, wherein the first electrode is a grounding electrode and the second electrode is an address electrode.

15. The device according to claim 12, wherein the first and second alignment layers each comprise at least one of a copolymer, a polymer, obliquely evaporated SiO, and silane coupling agents.

16. The device according to claim 12, wherein the liquid crystal material is disposed in a layer that has a thickness of less than about 25 $\mu$m.

17. The device according to claim 12, wherein the liquid crystal layer comprises at least one of a nematic class liquid crystal material and a ferroelectric class liquid crystal material.

18. The device according to claim 12, wherein the liquid crystal layer comprises liquid crystal molecules that are oriented responsive to an applied voltage.

19. The device according to claim 18, wherein the liquid crystal molecules align with the electric field when a voltage exceeding a predetermined threshold voltage is applied.

20. The device according to claim 18, wherein the liquid crystal molecules align substantially perpendicular to any interface coated with the first alignment layer when substantially no voltage is applied.

21. The device according to claim 18, wherein the liquid crystal molecules align substantially perpendicular to any interface coated with the second alignment layer when substantially no voltage is applied.

22. A liquid crystal cross-connect device, comprising:

an input port for receiving light;

a polarization splitter to split the received light into transverse magnetic (TM) and transverse electric (TE) components;

a TM switch array connected to receive the TM components from the polarization splitter;

a TE switch array connected to receive the TE components from the polarization splitter;

a polarization combiner coupled to the TM switch array and the TE switch array to combine the outputs of the TM switch array and the TE switch array; and an output port coupled to the polarization combiner, wherein each of the switch arrays is in the range between about 50 and 500 $\mu$m center to center.

23. The device according to claim 22, wherein each switch array has a plurality of paths, each path comprising a switching element.

24. The device according to claim 22, wherein each of the polarization splitter, the TM switch array, the TE switch array, and the polarization combiner comprises a liquid crystal trench device comprising:

a substrate;

at least one first electrode disposed on the substrate;

a first cladding layer disposed on the first electrode;

a core layer disposed on the first cladding layer;

a second cladding layer disposed on the core layer;

a trench formed in the first cladding layer, the core layer, and the second cladding layer;

a first alignment layer disposed in the trench and on the second cladding layer;

a liquid crystal layer disposed on the first alignment layer;

a second alignment layer disposed on the liquid crystal layer; and a top plate layer disposed above the second alignment layer.

25. The device according to claim 24, wherein the top plate layer comprises a second electrode disposed above the second alignment layer above the trench and above a portion of the liquid crystal layer over the second cladding layer; and a cover glass disposed above the second electrode and the second alignment layer.

26. The device according to claim 25, wherein the first electrode is a grounding electrode and the second electrode is an address electrode.

27. The device according to claim 24, wherein the first and second alignment layers each comprise at least one of a copolymer, a polymer, obliquely evaporated SiO, and silane coupling agents.

28. The device according to claim 24, wherein the first cladding layer has a thickness between about 12 and 50 $\mu$m, the core layer has a thickness between about 4 and 10 $\mu$m, and the second cladding layer has a thickness between about 12 and 50 $\mu$m.

29. The device according to claim 24, wherein the liquid crystal layer has a thickness less than about 25 $\mu$m.

30. The device according to claim 24, wherein the liquid crystal layer comprises at least one of a nematic class liquid crystal material and a ferroelectric class liquid crystal material.

31. The device according to claim 24, wherein the liquid crystal layer comprises liquid crystal molecules that are oriented responsive to an applied voltage.

32. The device according to claim 31, wherein the liquid crystal molecules align with the electric field when a voltage exceeding a predetermined threshold voltage is applied.

33. The device according to claim 31, wherein the liquid crystal molecules align substantially perpendicular to any interface coated with the first alignment layer when substantially no voltage is applied.

34. The device according to claim 31, wherein the liquid crystal molecules align substantially perpendicular to any interface coated with the second alignment layer when substantially no voltage is applied.

35. The device according to claim 34, wherein the TM switch array is an N×N waveguide having $N^2$ trenches, N being an integer.

36. The device according to claim 35, wherein all but one of the $N^2$ trenches are set in a transmission state.

37. The device according to claim 35, wherein the TE switch array is the voltage dual of the TM switch array.

* * * * *